United States Patent [19]

Hill et al.

[11] Patent Number: 4,840,206
[45] Date of Patent: Jun. 20, 1989

[54] HYDRAULIC FLUID-CONTAINERS AND RESERVOIRS

[75] Inventors: Adrian C. Hill, Winsford; Derek Jepson, Marton, both of England

[73] Assignees: Rolls-Royce Motors Limited, Crewe; Castrol Limited, Swindon, both of United Kingdom

[21] Appl. No.: 36,207

[22] Filed: Apr. 8, 1987

Related U.S. Application Data

[63] Continuation of Ser. No. 790,761, Oct. 23, 1985, abandoned, and a continuation of Ser. No. 543,897, Oct. 20, 1983, abandoned.

[30] Foreign Application Priority Data

Oct. 22, 1982 [GB] United Kingdom ............... 8230159
Dec. 10, 1982 [GB] United Kingdom ............... 8235325

[51] Int. Cl.⁴ .......................... B65B 3/00; B67C 3/00; B67D 5/06
[52] U.S. Cl. .................... 141/349; 141/346; 141/372; 222/521
[58] Field of Search .............. 222/519–521, 222/511, 513, 516; 141/319–322, 346, 372, 348–350; 285/D15

[56] References Cited

U.S. PATENT DOCUMENTS

| 1,739,357 | 12/1929 | Gatchell . | |
| 2,084,344 | 6/1937 | Jesnig | 222/521 |
| 2,489,746 | 11/1949 | Buneta | 226/127 |
| 3,185,503 | 5/1965 | Angle | 285/361 |
| 3,206,933 | 9/1965 | Dega | 141/346 |
| 3,880,317 | 4/1975 | Arnett | 141/325 X |
| 4,123,089 | 10/1978 | Viero et al. | 285/D15 X |
| 4,150,673 | 4/1979 | Watt | 285/D15 X |
| 4,269,237 | 5/1981 | Berger | 141/346 |

FOREIGN PATENT DOCUMENTS

| 1033571 | 7/1953 | France . | |
| 1277091 | 3/1962 | France . | |
| 1454948 | 10/1966 | France | 285/360 |
| 1132333 | 10/1968 | United Kingdom . | |
| 1216656 | 12/1970 | United Kingdom . | |

Primary Examiner—Joseph J. Rolla
Assistant Examiner—Mona C. Beegle
Attorney, Agent, or Firm—Cushman, Darby & Cushman

[57] ABSTRACT

A hydraulic fluid container (10,110) is specially adapted to mate with a vehicle hydraulic fluid reservoir (40,160) for the purpose of transferring fluid from the container to the reservoir. In one embodiment a spout (24) has a particular cross section which matches the opening (46) in the reservoir. In another embodiment a valve (148,150,216, 218,316,318,416,418) in the container or reservoir is opened by a probe (164,232,332) in the other of the container and reservoir when the container and reservoir are mated together. The invention prevents fluid from a container not specially adapted to the reservoir being added to reservoir.

4 Claims, 4 Drawing Sheets

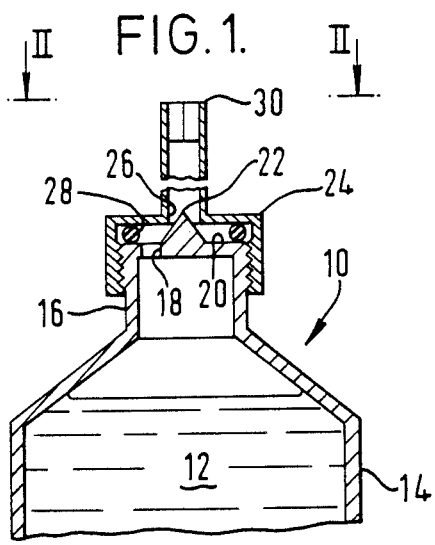
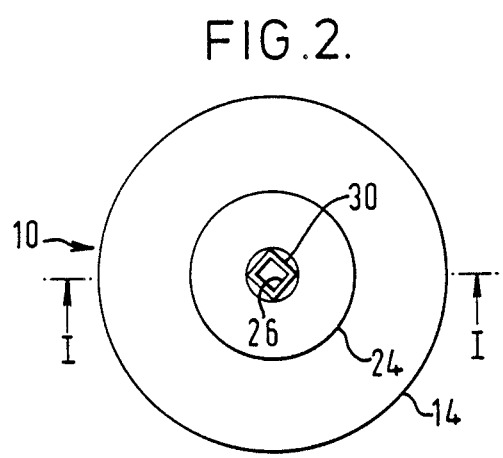
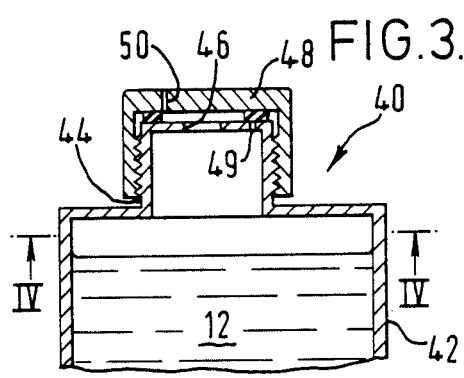
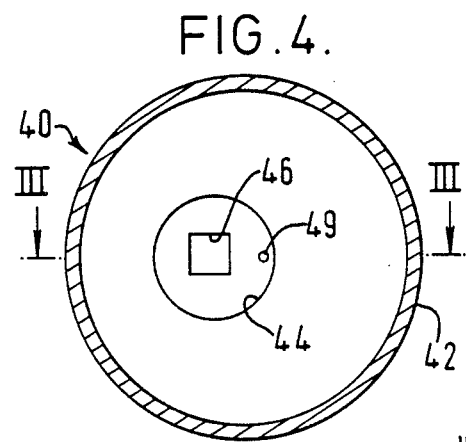
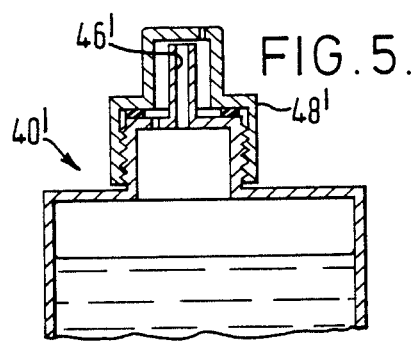
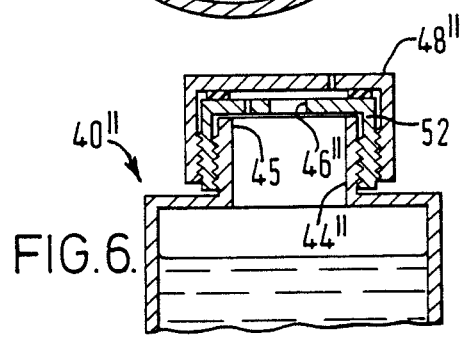

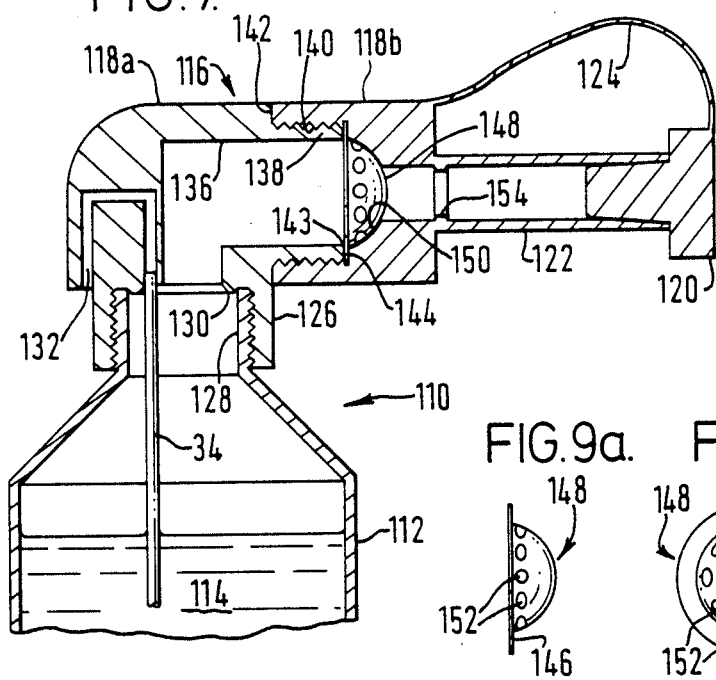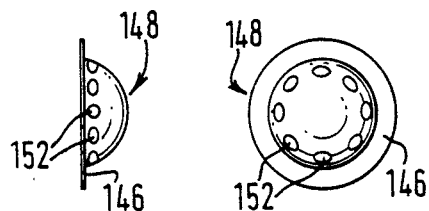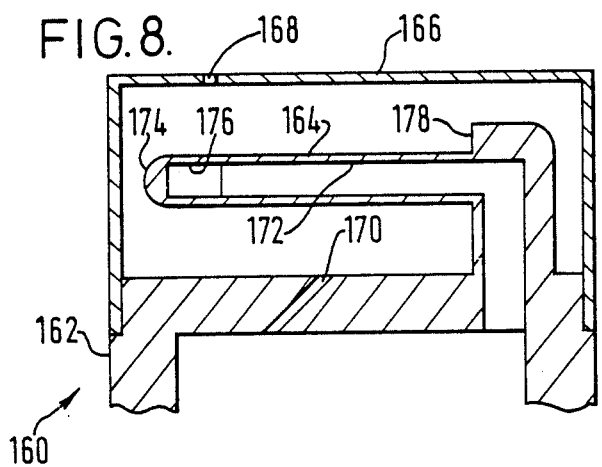

HYDRAULIC FLUID CONTAINERS AND RESERVOIRS

This is a continuation of application Ser. No. 790,761, filed Oct. 23, 1985 and a continuation of Ser. No. 543,897 filed Oct. 20, 1983, both abandoned upon the filing hereof.

TECHNICAL FIELD

This invention relates to hydraulic systems in motor vehicles and to containers of hydraulic fluids used for filling or topping-up such systems.

BACKGROUND ART

It is becoming an increasing trend in the automotive industry to centralise the hydraulic systems of some cars. Thus a car may have a single source of hydraulic fluid under pressure to operate the brakes, steering, suspension and other hydraulically operated functions. Under these circumstances it is the normal practice to employ a mineral oil hydraulic fluid. This is because these fluids have good lubricating properties such that wear in the various components of the system are kept to a minimum. Moreover seals are now available, and have been for some time, which are quite compatible with long chain hydrocarbons. However when hydraulic brake systems were first introduced the rubber seals, which were the only types of seal then available, were not compatible and tended to swell in the presence of mineral oil adversely affecting their proper function. It was found necessary therefore to employ a different fluid and the glycol, polyglycol, glycol-ether type fluids were developed. These products and their derivatives were, and are, quite satisfactory in most respects for use in simple brake systems but they do suffer from a lack of significant lubricating properties. Thus they are largely unsuitable for use as a central hydraulic system fluid. Nevertheless they have been in service for many years as a brake fluid and this has lead to the belief by unsuspecting members of the public that these fluids can be added to any brake or hydraulic system. Unfortunately this is not the case and by adding a non-hydrocarbon based fluid to a hydrocarbon based system the seals compatible with hydrocarbon fluids are attacked by and absorb the non-hydrocarbon fluid. The result is that the seal swells and again adversely affects its proper operation.

Despite prolific warnings on hydraulic fluid containers and hydraulic fluid reservoirs and in service manuals etc., it still occurs that Owners Or garage mechanics add non-hydrocarbon brake fluids to the mineral oil central hydraulic systems in their cars. With the system pump distributing the contamination to every part of the system all the seals become affected. By the time the owner notices anything wrong with the performance of his car one whole system must be dismantled, flushed out and new seals installed. This is a costly venture particularly if the owner of the vehicle notices the contamination by virtue of his brakes failing. It is mainly for this reason that vehicle manufacturers generally have not employed mineral oils as brake fluids, even though they are more suitable in many respects than conventional non-hydrocarbon brake fluids.

It is an object of this invention to alleviate this problem of contamination.

DISCLOSURE OF INVENTION

In accordance with this invention there is provided a physically matched hydraulic fluid container and opening into a reservoir of a hydraulic fluid system such that only said container can be mated in substantially fluid-tight male/female relationship to said opening for the transference of hydraulic fluid in the container into the reservoir.

Thus containers for containing another type of hydraulic fluid have a different construction, possibly for similar mating with hydraulic systems compatible with said other type of hydraulic fluid, such that they cannot be mated in substantially fluid-tight male/female relationship to said reservoir.

As used herein the expression "fluid tight" should not be construed in the strictest sense but rather as meaning that fluid may be transferred from container to reservoir without significant spillage. Clearly the joint between container and reservoir cannot be utterly fluid-tight in normal circumstances because air must be displaced in the reservoir and possibly allowed to enter the container as transference of fluid is effected.

By employing the present invention the addition of incorrect hydraulic fluid to a particular hydraulic system can be prevented, or at least made more difficult to achieve so that the number of occasions when this is done is reduced.

Preferably one of the container or reservoir has a selectively openable extended opening having a particular cross-sectional shape and the other has a selectively openable opening having a corresponding cross-sectional shape into which said extended opening can be mated for substantially fluid-tight transference of fluid from the container to the reservoir.

Preferably said extended opening is formed on a closure of the container. The closure may be screw threaded onto the container such that when it is screwed tight, said opening is sealed closed but when partially unscrewed said opening is opened. This may be effected by providing an obturator on the container adapted to seal said opening when the closure is screwed tight but which allows the passage of fluid through said opening via holes in the container around the obturator when the closure is partially unscrewed.

Alternatively, said opening into the reservoir may actuate a valve in said container when mated with said container to allow the passage of fluid out of the container.

Preferably said valve comprises a resiliently flexible disc seated in a cap housing of the container and having one or more apertures which are normally closed by the seating for the disc but which are opened to allow passage of fluid out of the container by said opening into the reservoir deforming said disc when said opening is mated with the container.

Preferably said disc is normally dome-shaped having a plurality of peripherally disposed apertures and the seating in the cap housing is frusto-spherical, said opening into the reservoir being disposed on the side of a probe adapted to depress the disc thereby opening said apertures.

Preferably said cap housing is provided with a sleeve forming a loose fit over said probe when mated therewith but having a seal to seal said sleeve to the probe before said probe opens said apertures in the disc. Preferably said cap housing is arranged substantially at right angles to the main body of the container.

Alternatively or additionally the probe may be arranged substantially horizontal when said reservoir is in an operational position in the vehicle.

Preferably said container cap housing, is provided with an air breather to allow air to enter said container as liquid contained therein is transferred to the reservoir.

Alternatively the valve may be provided in the reservoir for actuation by the opening in the container. Said valve may comprise a sprung ball. The opening of the container may be disposed on the side of a probe forming part of the container or of a cap for the container.

The invention also provides a cap for a vehicle hydraulic system fluid reservoir, said cap being adapted to be secured to the mouth of the reservoir and having an opening which is adapted to receive the physically matched opening of a container of hydraulic fluid such that only said container can be mated in substantially fluid-tight male/female relationship to the reservoir cap opening for the transference of hydraulic fluid in the container into the reservoir.

The invention further provides a hydraulic fluid container having an opening or an opening in a cap therefor which is adapted to mate in substantially fluid tight male/female relationship with a physically matched opening in a vehicle hydraulic system fluid reservoir such that only to said reservoir can the opening in the container or its cap be mated for the transference of hydraulic fluid in the container into the reservoir.

BRIEF DESCRIPTION OF DRAWINGS

The invention is further described hereinafter with reference to the accompanying drawings in which:

FIG. 1 is a section along lines I—I of FIG. 2 through a hydraulic fluid container according to the invention;

FIG. 2 is a plan view on the lines II—II of FIG. 1

FIG. 3 is a section along the lines III—III of FIG. 4 through a brake or clutch master cylinder reservoir in accordance with the invention;

FIG. 4 is a plan view on the lines IV—IV of FIG. 3;

FIG. 5 is a section through another embodiment of a reservoir as shown in FIG. 3;

FIG. 6 is a section through yet another embodiment of an adapted reservoir according to the invention;

FIG. 7 is a section through a container and cap housing therefor forming a part of an example in accordance with the present invention;

FIG. 8 is a part section through a reservoir opening of a vehicle hydraulic system forming another part of the example shown in FIG. 1;

FIG. 9a and 9b show details of a valve disc incorporated in the cap housing of FIG. 1; and, FIG. 10a is a section through a reservoir cap of another embodiment of the invention;

FIG. 10b is a section through a container spout complementary to the reservoir cap of FIG. 10a.

MODES FOR CARRYING OUT THE INVENTION

Figure 10A:
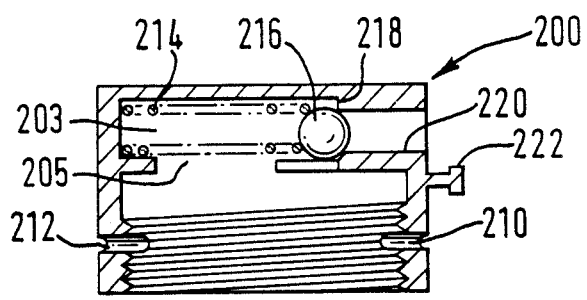

Referring to FIG. 1 a container 10 for hydraulic fluid 12 comprises a body 14 terminating in a screw threaded neck 16 having openings 18 in the top surface 20 of the neck 16. The top surface 20 has a centrally placed conical obturator 22.

A closure 24 is adapted for screw threaded engagement with the neck 16. The closure 24 has a centrally placed circular opening 26 which seals against the obturator 22 when the closure is screwed tight. A seal 28 seals openings 18 from the screw threaded portions of the neck 16 and closure 24.

When the closure 24 is partially unscrewed an annular passage is immediately opened between opening 26 and obturator 22. Seal 28 expands however and maintains its sealing engagement with the container neck 16 and closure 24. Nevertheless fluid can now be dispensed through openings 18 and opening 26 into a spout 30 of the closure 24. It can be seen from FIG. 2 that the spout 30 is arranged with a square cross-section at its end. Other cross sections such as triangular, polyhedral or star-shaped may be employed. FIG. 3 illustrates a master cylinder reservoir 40 containing hydraulic fluid 12. Reservoir 40 comprises a body 42 and a screw threaded neck 44 having a central opening 46. A conventional closure 48 normally seals the opening 46 although fine holes 50 in the closure 48 allow the reservoir to breath as the level of fluid 12 changes.

When fluid is to be added to the system, closure 48 is removed from reservoir 40. The spout 30 of fluid container closure 24 is inserted into opening 46 which as can be seen in FIG. 4 is arranged with a square cross-section corresponding to that of the spout 30. The spout 30 is arranged as a close fit in opening 46.

When the spout 30 is in place, the container 14 is partially unscrewed from the closure 24 thereby opening opening 26 and allowing fluid 12 to pass into reservoir 40 under the influence of gravity or by squeezing container 14 when this is constructed from a deformable plastics material. As the fluid enters reservoir 40, the air contained therein is vented through hole 49 although this may not be necessary if the fit of the spout 30 in opening 46 is not arranged so tight that air cannot escape from the reservoir.

By arranging for hydraulic reservoirs using one type of hydraulic fluid to have an opening 46 of a particular cross-sectional shape; by only supplying that type of hydraulic fluid in containers provided with a spout 30 of corresponding cross-sectional shape; and by supplying other types of hydraulic fluid in containers not provided with such a spout 30, the risks of inadvertently adding the wrong fluid to a particular hydraulic system can be minimised substantially.

FIG. 5 illustratres an alternative embodiment of reservoir 40 which is perhaps preferable because its opening 46′ is arranged as the male part in the mating of container closure 24 to reservoir 40′ and consequently can be given a much smaller internal diameter thus rendering the introduction of hydraulic fluid into the reservoir extremely difficult except via a container 10 having an appropriately shaped female-type spout 30. The reservoir 40′ has an appropriately shaped closure 48′.

FIG. 6 illustrates another embodiment which comprises a conversion for existing hydraulic fluid reservoirs 40″ having a conventional neck 44″ and opening 45. An adaptor 52 replaces the conventional closure and is provided with a square cross-section opening 46" similar to the opening 46 in FIG. 3 and for mating with spout 30 of container 10. The adaptor 52 is externally screw threaded to receive a closure 48" having a larger internal diameter than that of the existing closure which is discarded.

Referring to FIG. 7, the container 110 comprises a main body portion 112 for containing hydraulic fluid 114 and a cap 116. The cap 116 comprises first and second housing parts 118a and 118b respectively and a plug 120 press fitted, for instance, into a sleeve 122 formed on second housing part 118b. The plug 120 may have an integral flexible tag 124 permanently connecting the latter to the sleeve 122 so as to prevent inadvertent loss of the plug during a filling operation. The cap 116 is preferably constructed from plastics material.

Part 118a has screw threaded portion 126 for engagement with the neck 128 of container body 112. An annular rib 130 seals part 118a to the body 112. A breather passage 132 is formed in part 118a and has a tube 134 fixed therein which extends almost to the base (not shown) of container 112 when the cap 116 is fitted thereto. A main fluid passage 136 is formed in part 118a terminating in screw threaded portion 138 to which part 118b, correspondingly threaded at 140, is connected. The portions 138 and 140 are of such length that the portion 140 abuts a shoulder 142 on part 118a when a small gap 143 is left between portion 138 and a shoulder 144 in part 118b.

Disposed in this gap 143 is a peripheral flange 146 (see FIGS. 9a and 9b) of a domed sealing disc 148 which is seated on a frusto spherical seat 150 disposed in the part 118b. The seat 150 is in fluid communication with the sleeve 122. The gap 143 is such that the flange 146 seals the connection between the two parts 118a and 118b. Moreover the disc is so shaped to conform with the frusto spherical seat 150 so that holes or apertures 152 formed in the disc 148 are nevertheless sealed by the seat 152. Indeed the domed disc 148 is constructed from a resiliently flexible material and is arranged to be compressed slightly by the seat 150 to ensure that holes 152 are retained closed. Furthermore, should the container be inverted fluid pressure tends to seat the disc 148 even more firmly ensuring a good seal. The plug 120 is provided essentially to prevent dust and dirt entering the sleeve 122.

Turning to FIG. 8 the reservoir or reservoir closure 160 comprises a body 162 which is provided with a probe 164 shown in the present embodiment to be arranged substantially horizontally. A dust cap 166 prevents dust and dirt contaminating probe 164.

Air breather holes 168, 170 are provided in the cap 166 and body 162 respectively to allow fluid level in the reservoir to change during normal operation of the vehicle hydraulic system (not shown) of which the reservoir 160 forms a part.

The probe 164 is in fluid communication with the reservoir 160 via passage 172 and is provided with a rounded or coned end 174 and a lateral opening 176 disposed adjacent said end. A shoulder 178 defines the base of the probe 164.

When the reservoir 160 is to be topped up with fluid from container 110 first cap 166 is removed from the reservoir 160 and then plug 120 from sleeve 122. Next the sleeve 122 is engaged with the probe 164 in male-/female type relationship. This may be accomplished even with the container 112 inverted, because as yet no fluid can escape past the seal formed by disc 148. Indeed although the present example is preferred, it is feasible to arrange for the sleeve 122 to be axially inline with the container 112 and for the probe to be substantially vertical. In this case the part 118a can be dispensed with and the part 118b directly connected to the container 112. However this presupposes adequate room in the vehicle compartment in which the reservoir is fitted and this is not always the case. With the embodiment illustrated, the container 112 can be rotated about the axis of the sleeve 122 to achieve any angle to the vertical within the confines of the space available around the reservoir 160. Moreover the top of the reservoir as illustrated in FIG. 8 does not require much greater vertical space than a reservoir with a conventional closure.

The sleeve 122 is arranged as a loose fit on the probe 164 but to seal the two together, an internal rib 154 is formed in the sleeve 122 which engages and seals around the periphery of the probe 164 as the probe and sleeve are mated together.

As the rib 154 passes over opening 176 in the probe 164, the end 174 of the probe engages the disc 148 lifting the latter off its seat 150. Eventually the end of the sleeve 122 abuts shoulder 178 on the probe 164 and prevents further movement. However, the end 174 has by this time completely lifted disc 148 off its seat so opening the holes 152 in the disc 148. Fluid in the container can now be transferred, either under the influence of gravity, or by squeezing container 112 if this is of the deformable type, into reservoir 160 via passage 136, holes 152, opening 176 and passage 172. Meanwhile air can escape from the reservoir through breather hole 170. Moreover air can enter container 112 through breather passage 132 and tube 134 although this provision is not necessary where the container 112 is deformable as mentioned above.

Although the present container is already physically matched to reservoir 160 and that it would be almost impossible to fill reservoir 162 from a container of hydraulic fluid not of the type shown in FIG. 7, at least not without significant spillage, it is nevertheless possible to further match the two by rendering probe 164 and sleeve 122 of some non-circular cross-sections in accordance with the principles described with reference to FIGS. 1 to 6. For instance the probe and sleeve may be given corresponding square cross-section but this would prevent rotation of the container 112 about the axis of the sleeve 122 unless for instance the sleeve 122 was arranged rotable in the cap housing part 118b. Non-rotation of the container 112 would not however be a serious deficiency as long as the square or other type sections of the probe 164 and sleeve 122 were arranged such that they could be mated with the container 112 at an acceptable angle.

Once the reservoir 160 is filled to the desired level, indicated for instance through a transparent sight glass on the side of the reservoir 160 if the latter is not itself transparent enough for an observer to appreciate fluid level, then the container is simply withdrawn off probe 164. The disc 148, which as mentioned already is resiliently flexible, then returns to the position illustrated in FIG. 7 where the holes 152 are closed. Thus no more fluid can escape.

To minimise fluid loss during uncoupling the probe 164 may be inclined slightly so that fluid therein flows under gravity into reservoir 160 and/or opening 176 may be disposed on the top surface of the probe.

It should be appreciated that the reservoir 160 as illustrated in FIG. 8 may in fact be merely a plastics adapter for fitting to existing fluid reservoirs thereby minimising the alteration of standard vehicle equipment and hence cost. Moreover the cap 116 may be such that it fits to existing hydraulic fluid containers for the same reason of reducing the cost of employing the present invention.

Figure 10B:
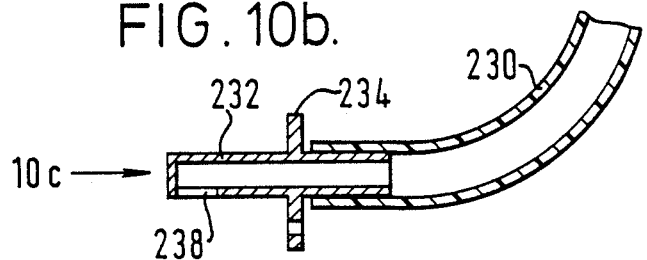
Figure 10C:
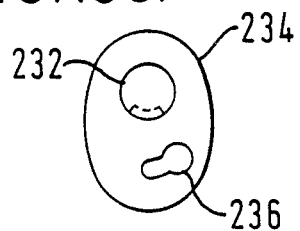
FIG. 10c is an end elevational view of the spout of FIG. 10b taken in the direction of the arrow 10c on FIG. 10b.

Referring to FIGS. 10a, 10b and 10c, a further embodiment of the invention is illustrated in which a valve is incorporated in the moulded synthetic plastics material cap of the mineral fluid reservoir. The cap which is referenced 200 is internally screwthreaded for engagement with complementary external screwthreads on the body of the reservoir (not shown). The cap defines a cavity 203 in its upper part having a mouth 220. This cavity houses a compression spring 214 which is constrained to act between one side of the cavity and a valve ball 216 which it urges against a valve seat 218, formed by an abuttment in the internal wall of the cavity 203 to close off the mouth 220. The cavity 203 communicates with the remainder of the interior of the cap via an aperture 205.

Slots 210 and 212 are cut into the external surface of the cap and corresponding slots are cut into the external surface of the neck of the reservoir body (not shown). After the cap is screwed onto the reservoir, a wire is passed through the slots and sealed. The cap cannot then be removed without breaking the seal, thus providing an indication of tampering. An integrally moulded flanged pip 222 is disposed adjacent the mouth 220 externally of the cap for a purpose to be described later.

The container may be any conventional collapsible container having a flexible spout 230. In the end of the spout 230 (see Fig 10b) a special adaptor 232 is fitted. The adaptor 232 has a peripheral flange 234 (see also Fig 10c which is a view in the direction of the arrow 10c in Fig 10b). The flange 234 has a keyhole slot 236 cut into it. The diameter of the adapter is approximately equal to that of the mouth 220 of the cap 200. The flange 234 is so dimensioned that the adapter cannot be pressed so far into the mouth 220 as to lift the ball 216 off its seat 218 unless the flanged pip 222 passes through the larger part of the keyhole slot 236. Having done so however the adaptor can be rotated to lock the adaptor to the mouth of the cap 200. In this position the ball is pushed off its seat and a side aperture 238 in the adaptor 232 points downwards and lines up with the aperture 205 in the cap. Hydraulic fluid can then be transferred from the container to the reservoir via these aligned apertures.

Figure 11A:
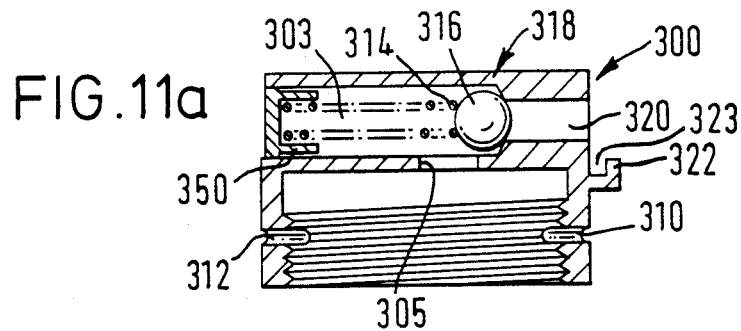
FIGS. 11a, 11b and 11c are views corresponding to FIGS. 10a 10b and 10c but of a further embodiment of the invention.
Figure 11B:
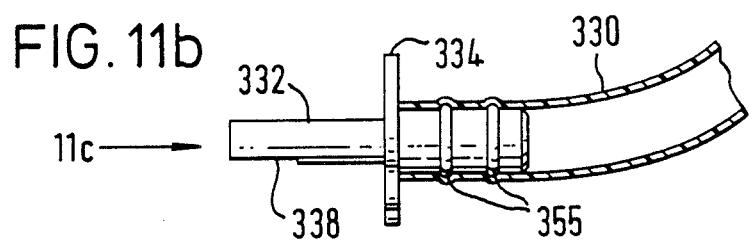
Figure 11C:
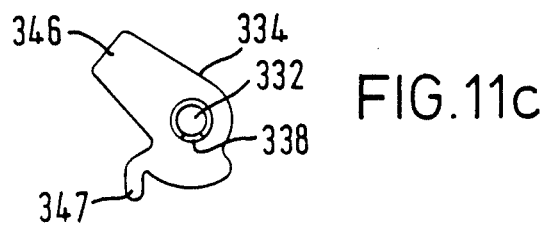

An alternative to the embodiment of FIGS. 10a, b and c is shown in FIGS. 11a, b and c which respectively correspond to FIGS. 10a, b and c. Parts of this FIG. 11 embodiment which correspond to those of the embodiment of FIGS. 10a, b and c have the same references but with the initial number two replaced by numeral three. In the figure 11a, b, c embodiment, the flanged pip 222 is replaced by a projection 322 which defines a groove 323 with the external wall of the cap. The flange 234 on the spout is replaced by a flange 334 of a different shape. This flange 334 has a part 346 which locks into the groove 323 when the spout is inserted into the mouth 300 and rotated relative to the cap. Over rotation of the spout is prevented by a further part 347 which abutts the base of the projection 322 when the spout has been rotated to bring apertures 328 and 305 into line. Other differences between the FIGS. 10 and 11 embodiments are that a cap part 356 is formed to accommodate the base of the compression spring, the valve seat 318 has a frusto-conical shape, the spout adapter 332 is open ended and ribs 355 are formed externally of the adapter to retain the spout thereon. That part 350 of the cap which receives the spring 314 is separate from the remainder of the cap and is secured in position by means of adhesive after insertion of the ball 316 and spring 314. This facilitates insertion of the ball and spring.

Figure 12:
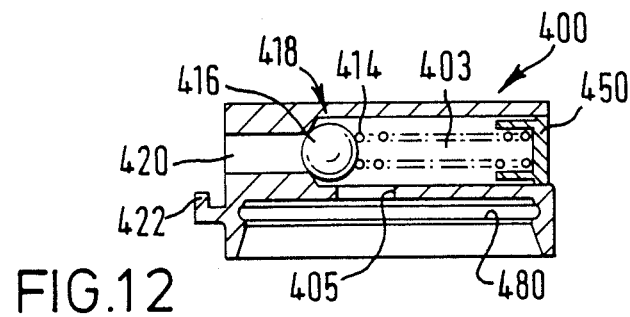
FIG. 12 shows a modification of the embodiments of FIGS. 10 and 11.

Interconnection of the cap and reservoir may be other than screwthreaded. For example, the cap may clip on as shown in FIG. 12, the neck of the reservoir being shaped correspondingly with an appropriate rim 480. Parts of this modification corresponding to those of the FIG. 11 embodiment bear the same references but with the first numberal three replaced by the numeral four. This cap may also be provided with a tamper indicator similar to that of the arrangements of FIGS. 10 and 11. It will be appreciated that the caps of the embodiments of FIGS. 10, 11 and 12 may be constructed to replace existing vehicle hydraulic system reservoir caps or as original equipment for such vehicles.

We claim:

1. An arrangement of a motor vehicle hydraulic fluid system reservoir and a container for fluid to be transferred to the reservoir comprising:
    an opening in the reservoir;
    a cap having a substantially restricted orifice removably positioned on said opening;
    a discharge opening in the container adapted to mate in substantially fluid-tight male/female relationship with said orifice of said cap when on the reservoir for the transference of fluid from the container into the reservoir, said orifice in said cap having a valve means normally closed but being openable when said opening in said container is mated therewith, said discharge opening in said container mating with said orifice in said cap only when the cross-sectional shapes thereof are the same;
    a locking member for interlocking said cap and said discharge opening in said container to one another; and
    wherein said cap further comprises an opening therein for permitting air to escape from said reservoir while it is being filled via said restricted orifices in said container and reservoir.

2. The motor vehicle hydraulic fluid system of claim 1 wherein said orifice in said cap is normally closed by means of a ball valve biased against said orifice.

3. A method of supplying hydraulic fluid to the reservoir of a hydraulic system of a vehicle in order to reduce the incidence of contamination of a fluid, said method including the steps of:
    providing the reservoir with an inlet;
    providing a cap for said inlet having a substantially restricted orifice therein;
    providing said container with an outlet, said outlet having a substantially restricted orifice, said orifices of said cap and said container being in a form which may be mated together in a substantially fluid-tight male/female relationship;
    locking said cap and said container together when said orifices of said cap and said container are mated together in a substantially fluid-tight male/female relationship; and
    providing in said cap at least one aperture for permitting the air in said reservoir to escape while it is being filled via the restricted orifices in the container and reservoir.

4. The motor vehicle hydraulic fluid system of claim 1 wherein said locking member includes keying means and said opening includes a flange extending at least partly about said opening, said keying means including key elements and said flange including key element receiving openings disposed so that upon one rotational orientation thereof, said key elements will become inserted in said key openings in said flange whereupon continued rotation will effect locking of said cap to said opening.

* * * * *